Sept. 20, 1932.        L. L. ROBERTS         1,878,183
                       BOLT HEADING MACHINE
                   Filed July 13, 1928    5 Sheets-Sheet 5
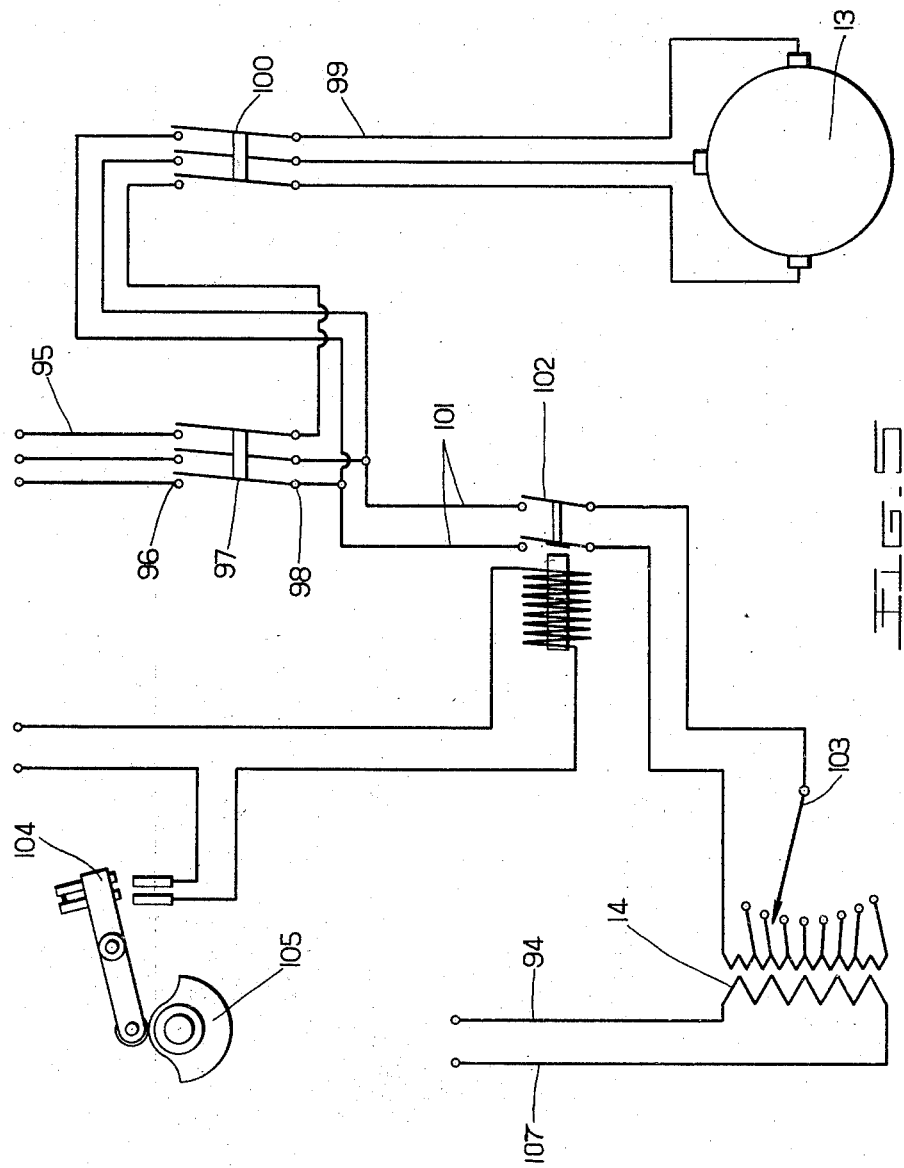
Inventor
L. L. ROBERTS
Attorney Patented Sept. 20, 1932

1,878,183

UNITED STATES PATENT OFFICE

LOUIS L. ROBERTS, OF DETROIT, MICHIGAN, ASSIGNOR TO PACKARD MOTOR CAR COMPANY, OF DETROIT, MICHIGAN, A CORPORATION OF MICHIGAN

BOLT HEADING MACHINE

Application filed July 13, 1928. Serial No. 292,345.

This invention relates to bolt heading machines.

An object of the invention is to provide a bolt heading machine having a movable work supporting head and indexing means for rotating the head for co-operation with a reciprocatory die moving normal to the path of movement of the head and in timed relation thereto.

Another object of the invention is to provide a bolt heading machine adapted to electrically heat a work piece or stud so that a head may be formed thereon, the stud or work piece being held for a short interval of time in an electrical heating circuit in which the stud itself forms part of the circuit and is electrically in series therewith.

A further object of the invention is to provide a bolt heading machine in which heating elements co-operate to heat one end of a stud or work piece internally and uniformly in a few seconds, so that when the work supporting head in which the work piece is positioned is rotated at the end of the heating period and indexed for co-operation with a reciprocatory die operating in timed relation thereto, an ideal upsetting condition prevails whereby a head is perfectly formed upon the stud.

With these and other objects in view which may be incident to my improvements, the invention consists in the parts and combinations of parts to be hereinafter set forth and claimed, with the understanding that the several necessary elements comprising my invention, may be varied in construction, proportion and arrangement without departing from the spirit or scope of the appended claims.

In order to make my invention more clearly understood I have shown in the accompanying drawings means for carrying the same into practical effect, without limiting the improvements in their useful application to the particular construction, which for the purpose of explanation, have been made the subject of illustration.

In the drawings forming a part of this specification:

Fig. 5 is a diagram of the electrical circuit for the operation of the machine.

Figure 1:
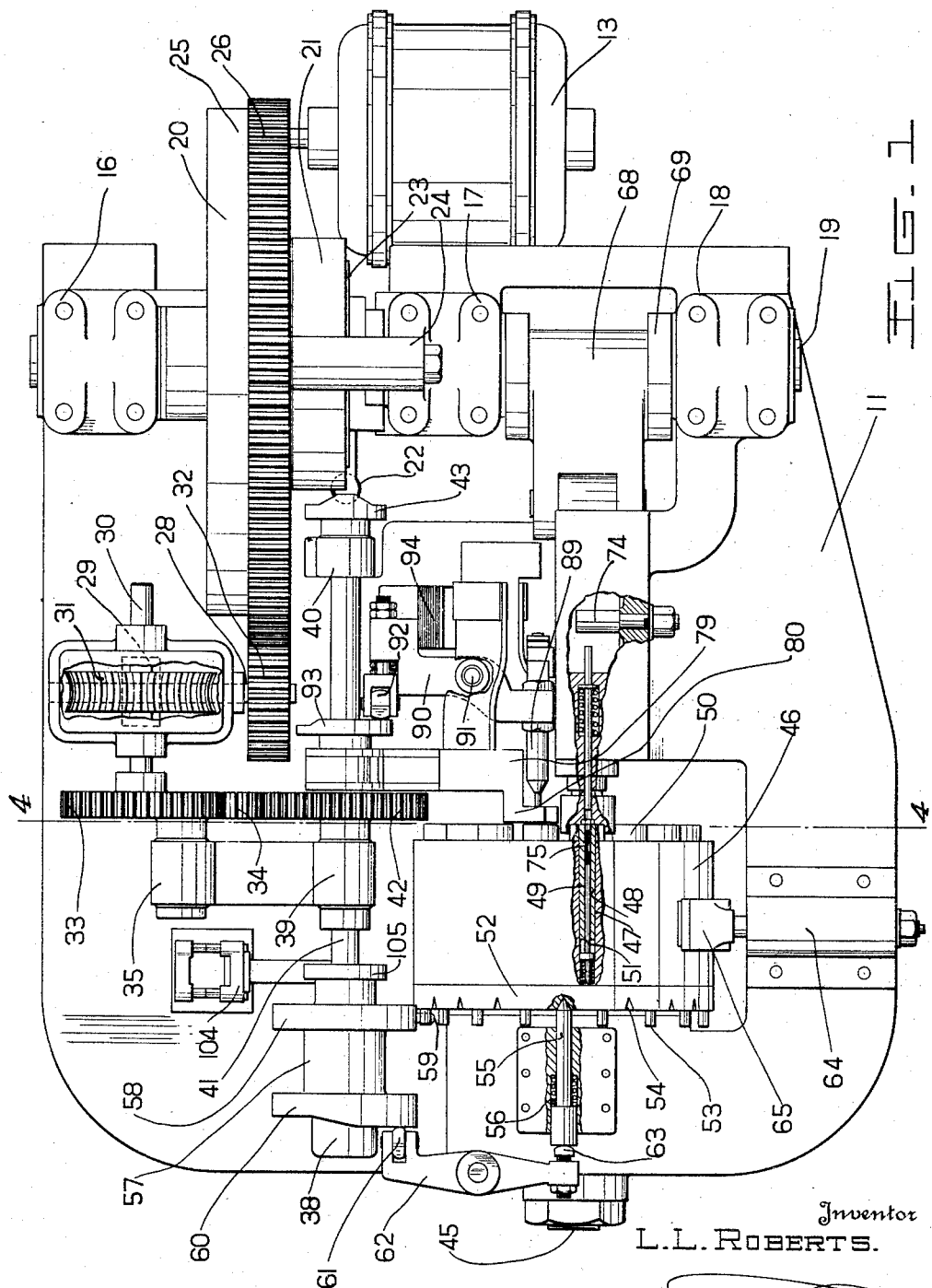
Fig. 1 is a top plan view of the complete machine.
Figure 2:
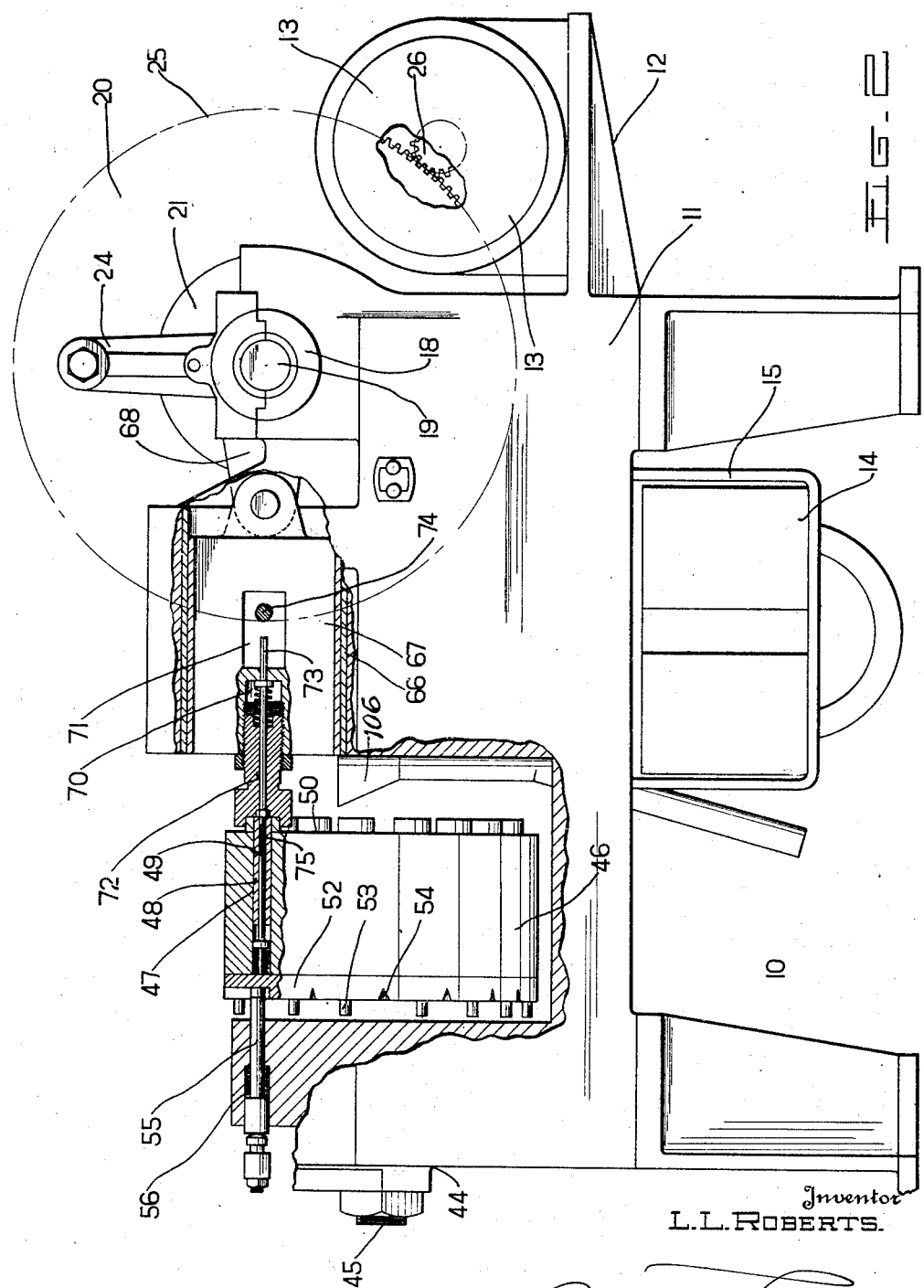
Fig. 2 is a front elevation.
Figure 3:
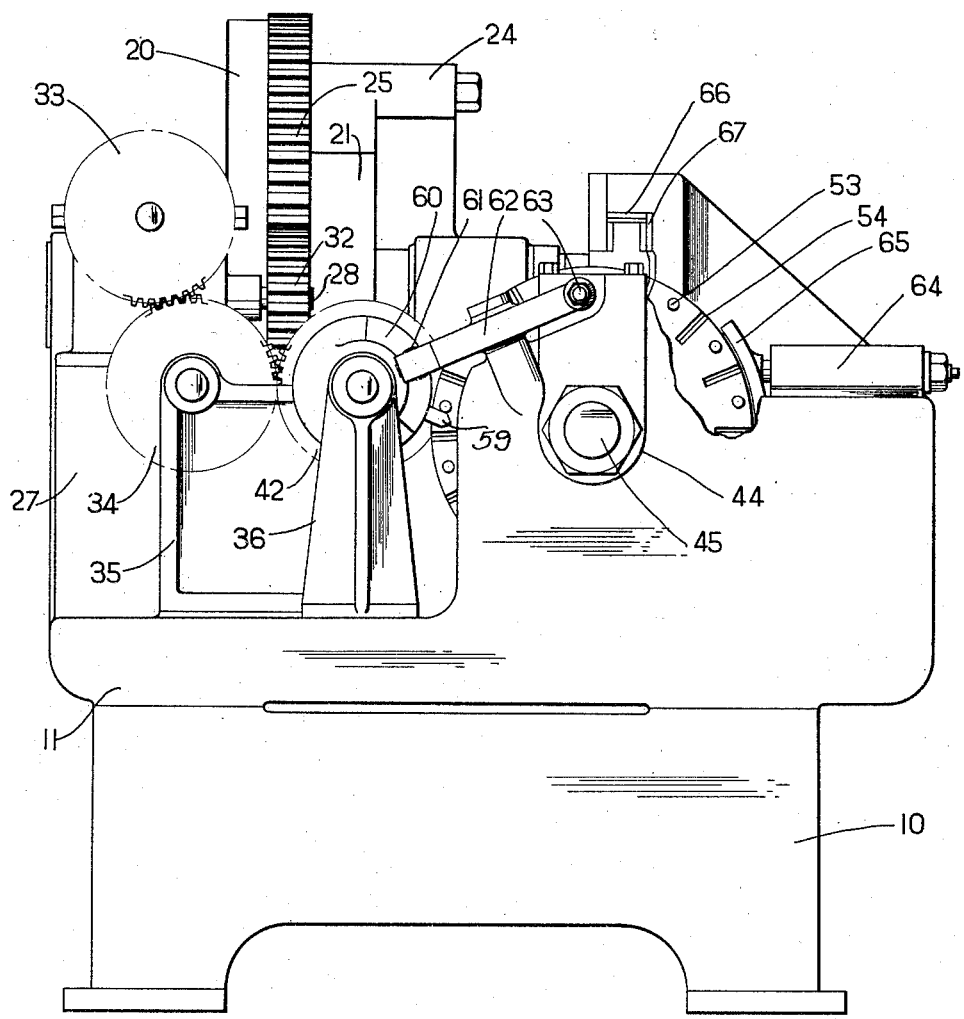
Fig. 3 is a side elevation.
Figure 4:
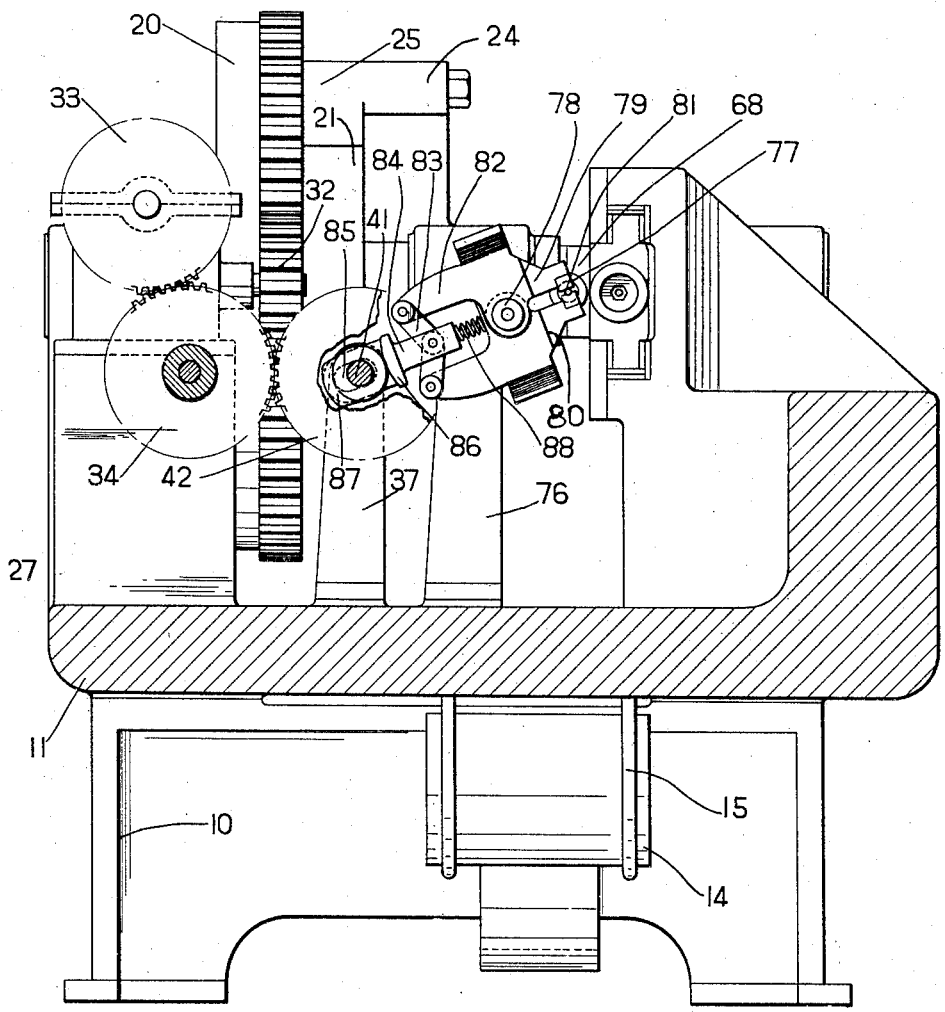
Fig. 4 is a cross sectional view taken on line 4—4 of Fig. 1.

Referring to the drawings for more specific details of the invention, 10 represents a suitable frame, and 11 a table supported thereby. As shown, the table is provided at one end with a bracket 12 having positioned thereon a motor 13 adapted to be connected to a source of electrical energy with a suitable transformer 14, preferably of the water cooled type, interposed in the circuit, the transformer being supported in hangers 15 secured to the under side of the table.

Journaled in suitable bearings 16, 17 and 18, arranged transversely on the table is a crank shaft 19 and, mounted for rotation on the crank shaft 19, is a fly wheel 20 adapted to be locked to the shaft by a suitable clutch mechanism 21, the operating lever of which is indicated at 22, the clutch being provided with a suitable brake 23 supported by a bracket or hanger 24 positioned on the top of the bearing 17.

The fly wheel 20 has formed on its periphery a gear 25 in mesh with a driving gear 26 keyed on the armature shaft of the motor 13. Positioned on the frame in a suitable support 27 is a worm gear reduction unit comprising a shaft 28 having formed thereon a worm gear 29 and a shaft 30 carrying a worm gear 31 in mesh with the worm gear 29. Keyed on the shaft 28 is a gear 32 in mesh with the gear 25 on the periphery of the fly wheel, and keyed on the shaft 30 is a gear 33 in mesh with the gear 34 journaled on a suitable support 35. Positioned on the table in spaced relation to the support 35 are supports 36 and 37. These supports have arranged thereon aligned bearings 38, 39 and 40 in which is journaled a drive shaft 41 positioned longitudinally with respect to the table and normal to the shaft 19. This shaft has keyed thereon a gear 42 in mesh with the gear 34 and positioned on the end of the shaft 41 adjacent the shaft 19 is a cam 43 engaging the operating lever 22 of the clutch mechanism.

Supported on the table in a suitable bracket 44 is a stub shaft 45 having mounted thereon for rotation a work supporting head 46 on the face of which is arranged in spaced relation in a circle the center of which is the axis of the work supporting head, a plurality of bores 47. These bores are parallel with respect to each other and to the axis of the work supporting head and each has mounted therein a work supporting member 48 comprising a tubular section 49 provided with a head 50 seated flush against the face of the work supporting head and a spring actuated plunger 51 is mounted in each of the tubular sections 49.

On the back of the work supporting head is secured an index plate or ring 52 provided with a plurality of studs or pins 53 arranged in spaced relation in a circle, the center of which is the axis of the work supporting head and arranged radially on the face of the plate between each pair of pins is a V-shaped notch 54 adaptable for engagement by a plunger 55 suitably mounted on the bracket 44 and normally held out of engagement with the notches 54 by a coil spring 56 wound upon the plunger.

Keyed on the shaft 41 is a sleeve 57 having formed thereon a radial flange 58 in the periphery of which is positioned a pin 59 providing a suitable cam adapted to engage the pins 53 on the index plate to step around the work supporting head 46 upon each revolution of the shaft 41. This sleeve also has formed thereon a cam 60 engaging a roller 61 journaled in one end of a rocker arm 62 pivoted on the support 44 and provided in its other end with a suitable tappet 63 engaging the plunger 55. As the work supporting head 46 is stepped around in the manner hereinabove described, the plunger 55 is actuated by the cam 60 and the rocker arm 62 to engage the V-shaped notch 54.

Because of the conical or V-shaped end on the plunger 55 corresponding in contour to the respective notches 54, the work supporting head is indexed with precision and exactitude and is held rigidly for a definite period against movement. To guard against a rapid rotation of the work supporting head or rotation beyond the desired angle when the pins 53 are engaged by the pin 59 a fixed brake 64 is positioned on the table and provided with an adjustable shoe 65 engaging the periphery of the work supporting head.

Positioned on the table is a guide 66 having mounted therein a reciprocatory member 67 connected by a suitable rod 68 to a crank 69 on the crank shaft 19. The reciprocatory member 67 has a longitudinal bore 70 and a diametrical slot 71. A die 72 is threaded in the bore 70 and positioned to register with the respective work supporting members 48.

The die has an axial bore in which is positioned a spring retracted plunger 73 adapted to engage a pin 74 positioned in the slot 71 so that upon reverse or backward stroke of the reciprocatory member the work piece 75 is ejected from the die.

Positioned on a suitable support 76 is an electrode 77 preferably waterjacketed. As shown, the electrode 77 has two corresponding members pivoted together on the support 76 as indicated at 78 to provide clamping jaws 79 offset as at 80 to straddle the work pieces or studs when positioned in the work holding members 48. When the work supporting head is rotated through the proper angle and indexed, the clamping jaws are moved toward one another so as to firmly clamp the stud or work piece between the arcuate faces 81 of the jaws.

The clamping jaws of the electrode are moved to open and closed position by arms 82 connected by a toggle 83 having pivoted thereto a rod 84 provided with a longitudinal slot 85 which receives the driving shaft 41. The rod 84 has formed thereupon an arcuate lug 86 engaging a cam 87 carried by the shaft 41. The arcuate lug on the rod is pressed in engagement with the cam on the shaft by means of a coil spring 88 interposed between the rod 84 and the arms of the electrode.

The structure of this clamping member is such that upon each revolution of the shaft 41 the clamping jaws are actuated to clamp and retain the body portion of a stud for a definite period of time requisite for the proper heating thereof. The current necessary for heating the stud is conveyed to the respective arms of the electrode by means of secondary bands suitably connected to the transformer, the bands being more or less flexible to permit free movement of the clamping jaws in the manner above described.

Arranged to co-operate with the electrode 77 is an electrode 89 also preferably water cooled. As shown, the electrode 89 is positioned in the end of an arm 90 pivoted as indicated at 91 and provided upon its other end with a roller 92 engaging a cam 93 keyed to the shaft 41. The electrode 89 is secured to a primary band 94 leading to and suitably connected to the transformer. By means of this structural arrangement the electrodes 77 and 89 co-operate with one another in timed relation for the proper heating of the stud or work piece.

In Fig. 5, I have shown a diagram of a circuit for the operation of the machine wherein suitable current is conducted through lines indicated at 95 connected to terminals 96 of a three-blade switch 97, the other terminals 98 of which are connected by lines 99 to the motor 13 with a suitable motor starting switch 100 and a service switch, not shown, interposed in the line. Connected to two of the terminals 98 of the switch 96 are lines 101 leading to the transformer 14 with a suitable relay switch 102 and a rheostat 103 interposed. The relay switch 102 is operated through an auxiliary switch 104 actuated by a timing gear 105 keyed on the shaft 41, and the transformer is suitably connected as by the secondary and primary bands 107 and 94 to the electrodes.

The operation of the machine is briefly given as follows: When the machine is in motion, the motor 13 through the gear 26 drives the fly wheel 20 journaled on the crank shaft 19. The fly wheel in turn drives a gear 32 keyed on one shaft of a reduction unit, the other shaft of which has keyed thereon a gear 33 in mesh with a gear 34 meshing with a gear 42 keyed on the driving shaft 41.

This train of gearing is such that the driving shaft 41 rotates at a rate considerably less than the rate of the fly wheel. In practice it has been found that a relative reduction of approximately 33 to 1 produces the desired result. As the shaft 41 rotates, the pin 59 carried by the drive shaft, engages one of the pins 53 in the work supporting head 46 whereupon the head is rotated to a position substantially opposite the spring retracted plunger 55. The plunger is actuated by the rocker arm 62 operated by the cam 60 on the drive shaft to engage one of the V-shaped notches in the index plate carried by the head to index and retain the work supporting head in a fixed position for a definite period of time.

As the work supporting head is moved to an indexed position the electrodes 77 and 89 automatically engage the work piece to complete the circuit and to heat the work piece for a definite period of time. This is accomplished by means of the cam 87 on the driving shaft actuating the electrode 77 to clamp the body of the work piece or stud, and a cam 93 also on the driving shaft which causes the electrode 89 to contact with the end of the work piece or stud upon which the head is formed.

The electrodes are retained in engagement with the stud for a predetermined period of time, sufficient to properly heat the stud, whereupon the cams break the contacts between the electrodes and the stud, and simultaneously the auxiliary switch 104 operated by the cam 105 on the shaft 41 breaks the circuit leading to the transformer, and the work supporting head is stepped around in the manner hereinabove described so that the work piece or stud is in direct alignment with the die carried by the reciprocatory member 67 connected by a rod to the crank on the crank shaft 19. At this step in the operation the cam 43 on the end of the driving shaft 41 actuates the trip lever 22 of the clutch mechanism 21 which locks the fly wheel 25 to the shaft 19 and causes the shaft to make one revolution whereby the reciprocatory member 67 is moved forwardly to press the die carried thereby with great force on the heated end of the stud to form the head thereon, inward movement of the stud in the work supporting member being limited by the spring actuated plunger 51.

As the die presses the heated end of the stud to form a head thereon, the head so formed binds in the die sufficiently tight to extract the work piece from the work supporting member 48 and as the reciprocatory member 67 moves in reverse stroke the spring retracted plunger 70 positioned in the axis of the die is caused to engage the stop 74 causing the plunger to eject the stud or work piece from the die whereupon the work piece drops in a suitable conveyor 106 through which it passes from the machine.

Although this invention has been described in connection with certain specific embodiments, the principles involved are susceptible to numerous other applications that will readily occur to persons skilled in the art. The invention is, therefore, to be limited only as indicated by the scope of the appended claims.

Having thus described the various features of my invention, what I desire to secure by Letters Patent, is:

1. In a machine for heating and forging metal blanks having a rotary blank supporting head and a drive shaft connected to rotate the head intermittently, an electrical heating device for said blanks comprising jaws associated to engage the blanks carried by the head, said jaws constituting a secondary electrode, means driven by the drive shaft and connected to the jaws to open and close them intermittently, a pin constituting a primary electrode connected to the drive shaft in a manner to be movable toward and away from said head, and means connecting the electrodes to a source of electrical current, said electrodes being timed to contact one of said blanks at the same time and between the intermittent movements of the rotary head to make an electric circuit through said blank for heating it to forging temperature.

2. In a machine for heating and forging metal blanks having a rotary blank supporting head and a cam drive shaft connected to intermittently rotate the head, an electrical heating device for said blanks comprising pivoted jaws associated to engage the blanks carried by the head, said jaws constituting a secondary electrode, a toggle connected to open and close said jaws, a rod having an arcuate lug thereon engageable with one of the cams on the drive shaft and connected to actuate the toggle, a spring associated with the rod and yieldingly holding it in engagement with the cam, said mechanism being adapted to operate the jaws intermittently, a pin constituting a primary electrode, said pin being connected to one of the cams of the drive shaft and associated to be moved toward and away from said head, and means connecting said electrodes to a source of electrical current, said electrode operating mechanism being timed so that said electrodes contact a blank at the same time and between the intermittent movements of the rotary head to make an electric circuit through said blank for heating it to forging temperature.

3. In a machine for heating and forging metal blanks having a rotary blank supporting head and a drive shaft therefor, an electrical heating device for said blanks comprising jaws associated to engage the blanks carried by the head, said jaws constituting a secondary electrode, means connected with the drive shaft and to the jaws to open and close said jaws intermittently, a pin constituting a primary electrode, a pivoted arm connected to move the pin toward and away from the head, cam means associated with the drive shaft to intermittently actuate the arm, and a roller on one end of the arm engageable with said cam means.

4. In a machine for heating and forging metal blanks having a rotary blank supporting head and a cam drive shaft associated to intermittently rotate the head, an electrical heating device for said blanks comprising pivoted jaws associated to engage the blanks carried by said head, said jaws constituting a secondary electrode, a toggle connected to open and close said jaws, a rod connected with the toggle and having a lug thereon engageable with one of the cams on the drive shaft, a spring associated with the rod and yieldingly holding it in engagement with said cam, said mechanism being associated to operate the jaws intermittently, a pin constituting a primary electrode, a pivoted arm connected to move the pin toward and away from the head, a roller on one end of the arm engaging another of the cams of the drive shaft to actuate said arm and said electrode pin, and means connecting said electrodes to a source of current, said electrode operating mechanism being timed so that the electrodes contact a blank at the same time and between the intermittent movements of the rotary head to make an electric circuit through said blank for heating it to forging temperature.

In testimony whereof I affix my signature.

LOUIS L. ROBERTS.